US012668025B1

(12) United States Patent
Powers

(10) Patent No.: US 12,668,025 B1
(45) Date of Patent: Jun. 30, 2026

(54) METHOD FOR CONTROLLING A FLUID FLOW DURING AN ADDITIVE MANUFACTURING PROCESS

(71) Applicant: United Launch Alliance, L.L.C., Centennial, CO (US)

(72) Inventor: James W. Powers, Denver, CO (US)

(73) Assignee: United Launch Alliance, L.L.C., Centennial, CO (US)

( * ) Notice: Subject to any disclaimer, the term of this patent is extended or adjusted under 35 U.S.C. 154(b) by 147 days.

(21) Appl. No.: 17/845,838

(22) Filed: Jun. 21, 2022

(51) Int. Cl.
| | |
|---|---|
| *B29C 64/364* | (2017.01) |
| *B29C 64/118* | (2017.01) |
| *B33Y 10/00* | (2015.01) |
| *B33Y 40/00* | (2020.01) |

(52) U.S. Cl.
CPC .......... *B29C 64/364* (2017.08); *B29C 64/118* (2017.08); *B33Y 10/00* (2014.12); *B33Y 40/00* (2014.12)

(58) Field of Classification Search
None
See application file for complete search history.

(56) References Cited

U.S. PATENT DOCUMENTS

| | | | | |
|---|---|---|---|---|
| 6,193,923 | B1 * | 2/2001 | Leyden ................... | B29C 41/36 264/401 |
| 7,521,652 | B2 | 4/2009 | Chung et al. | |
| 9,796,048 | B2 | 10/2017 | Lacy et al. | |

| | | | | |
|---|---|---|---|---|
| 10,053,988 | B2 | 8/2018 | Itzel et al. | |
| 10,059,053 | B2 | 8/2018 | Jaker et al. | |
| 10,265,941 | B2 | 4/2019 | Schuller et al. | |
| 10,647,060 | B2 | 5/2020 | Davis | |
| 10,661,341 | B2 | 5/2020 | Romano et al. | |
| 10,913,258 | B2 | 2/2021 | Doherty et al. | |
| 2007/0128715 | A1 * | 6/2007 | Vukasinovic | .......... C12M 23/22 435/303.1 |
| 2014/0102163 | A1 * | 4/2014 | Kaltenboeck | ......... C22C 45/003 72/364 |
| 2015/0057784 | A1 * | 2/2015 | Butler | ................... G06F 3/1288 700/119 |

(Continued)

FOREIGN PATENT DOCUMENTS

| | | | |
|---|---|---|---|
| CN | 108297430 | 7/2018 | |
| CN | 108698297 A | * 10/2018 | ............. B22F 10/18 |

(Continued)

OTHER PUBLICATIONS

CN 108698297 A translation (Year: 2023).*

(Continued)

*Primary Examiner* — Xiao S Zhao
*Assistant Examiner* — Guy F Mongelli
(74) *Attorney, Agent, or Firm* — Sheridan Ross P.C.

(57) ABSTRACT

Methods for controlling a fluid flow during an additive manufacturing process are provided. The method may comprise causing a fluid flow to move across a build volume and forming a component. The component may comprise a plurality of layers of material in the build volume and at least one directional portion comprising a plurality of layers of material in the build volume. The component includes at least one critical zone and the at least one direction portion is configured to at least in part direct the fluid flow to for block the fluid flow from the at least one critical zone.

24 Claims, 8 Drawing Sheets

(56) References Cited

U.S. PATENT DOCUMENTS

| | | | |
|---|---|---|---|
| 2015/0086408 A1 | 3/2015 | Kottlingam et al. | |
| 2016/0075091 A1* | 3/2016 | Cable | B29C 64/245 |
| | | | 528/272 |
| 2016/0207263 A1* | 7/2016 | Gordon | G05D 23/1917 |
| 2016/0236408 A1* | 8/2016 | Wolf | B29C 64/118 |
| 2016/0271870 A1* | 9/2016 | Brown, Jr. | C04B 35/64 |
| 2017/0001377 A1* | 1/2017 | Meisner | B29C 64/209 |
| 2017/0072626 A1* | 3/2017 | McConville | B29C 64/112 |
| 2017/0072632 A1* | 3/2017 | Page | B29C 64/106 |
| 2017/0106595 A1 | 4/2017 | Gunther et al. | |
| 2017/0129185 A1* | 5/2017 | Buller | B22F 10/36 |
| 2017/0252820 A1* | 9/2017 | Myerberg | B22F 12/10 |
| 2018/0071819 A1* | 3/2018 | Connor | B22F 10/10 |
| 2018/0126460 A1 | 5/2018 | Murphree et al. | |
| 2018/0133981 A1* | 5/2018 | Huang | B29C 64/209 |
| 2018/0154437 A1* | 6/2018 | Mark | B22F 1/10 |
| 2018/0178533 A1* | 6/2018 | Sakai | B22F 12/53 |
| 2018/0257138 A1* | 9/2018 | Mark | B22F 10/64 |
| 2018/0305266 A1* | 10/2018 | Gibson | B33Y 40/20 |
| 2018/0354036 A1 | 12/2018 | Koch et al. | |
| 2018/0370155 A1* | 12/2018 | Courter | B29C 33/448 |
| 2019/0077077 A1 | 3/2019 | Martin et al. | |
| 2019/0099943 A1 | 4/2019 | Connell | |
| 2019/0126558 A1* | 5/2019 | Waizenegger | H04N 1/40 |
| 2019/0240730 A1* | 8/2019 | Haider | B33Y 30/00 |
| 2020/0061655 A1 | 2/2020 | Wakelam et al. | |
| 2020/0061656 A1* | 2/2020 | Shalaby | B22F 10/77 |
| 2020/0215757 A1* | 7/2020 | Arienti | B29C 64/35 |
| 2022/0288873 A1* | 9/2022 | Wadsworth | B33Y 80/00 |

FOREIGN PATENT DOCUMENTS

| | | | | |
|---|---|---|---|---|
| DE | 102017122849 A1 * | 4/2019 | | A61L 2/022 |
| WO | WO 92/08592 | 5/1992 | | |
| WO | WO 2020/099214 | 5/2020 | | |

OTHER PUBLICATIONS

CN 108698297 translation (Year: 2018).*

CN-108698297-A (Year: 2018).*

"Metal 3D Printing for Conformally Cooled Mold Tools," Star Rapid, LTD, 2017, 10 pages [retrieved online from: www.starrapid.com/project/3d-printed-conformal-cooling-case-stud].

"Post-processing of additive manufactured parts with cooling channels," Rapid News Publications Ltd., Mar. 31, 2020, 6 pages [retrieved online from: https://www.tctmagazine.com/additive-manufacturing-3d-printing-news/post-processing-additive-manufacturing-components].

* cited by examiner

METHOD FOR CONTROLLING A FLUID FLOW DURING AN ADDITIVE MANUFACTURING PROCESS

FIELD OF THE INVENTION

The present disclosure relates to the field of additive manufacturing and, more particularly, to methods for controlling a fluid flow during an additive manufacturing process.

BACKGROUND OF THE INVENTION

Three-dimensional (3D) printing, and more specifically additive manufacturing, is a manufacturing process through which material is deposited layer-by-layer or a powder is heated to form components. Such manufacturing enables the printing or manufacturing of components having complex geometric shapes, which may be difficult or not possible to manufacture using conventional machining methods.

Fused Filament Fabrication (FFF) printing is a form of 3D printing in which a material such as thermoplastic filaments (such as Acrylonitrile Butadiene Styrene (ABS) or Poly Lactic Acid (PLA)) are extruded through a heated nozzle, which melts the material and applies the material layer by layer in a build area until a part or component is completed. During the 3D printing process, a base may be initially printed or the base may be prefabricated. The part may then be printed onto the base and, after completion of the part, the base may be removed from the part. Optionally, the base may be made from a different material than the part to facilitate separation of the part from the base. In other forms of 3D printing, such as selective laser sintering (SLS) or selective laser melting (SLM), a laser or other form of heat is used fuse (and melt, in the case of SLM) metallic powders together to form a component.

A temperature of the build area or volume is a critical parameter during the printing process in controlling various outcomes including material and dimensional properties. For example, a cooling rate of a portion of a component may depend on at least a thickness of the portion. Thus, components with varying thicknesses may lead to uneven cooling of different portions of the component. As such, during the printing process, a fan typically provides a lateral airflow (though the airflow may be in any directional) to help control the temperature in the build area. However, in some instances, the airflow may not be uniform in a larger build area or a feature may be blocking another feature from the airflow resulting in inconsistent temperature control. In other instances, a critical feature of a part may be more susceptible to overheating or overcooling than another feature of the part, for example, due to differences in thickness and shape of the features. Aspects of the present disclosure provide a method of controlling a fluid flow during an additive manufacturing process to control or affect temperature around such critical features.

SUMMARY

A method for controlling a fluid flow during an additive manufacturing process according to at least one embodiment of the present disclosure comprises causing a fluid flow to move across a build volume; and forming a component comprising a plurality of layers of material in the build volume and at least one directional portion comprising a plurality of layers of material in the build volume, the component having at least one critical zone, the at least one directional portion configured to at least in part direct the fluid flow to or block the fluid flow from the at least one critical zone.

Any of the aspects herein, wherein the at least one directional portion is a wall configured to block the fluid flow or a wall configured to direct the fluid flow relative to the at least one critical zone.

Any of the aspects herein, wherein the at least one directional portion configured to direct the fluid flow to the at least one critical zone increases convection that transfers heat between the at least one critical zone and the fluid flow.

Any of the aspects herein, wherein the additive manufacturing process uses a Fused Filament Fabrication printer.

Any of the aspects herein, wherein the at least one directional portion is spaced from the at least one critical zone.

Any of the aspects herein, wherein the space between the at least one critical zone and the at least one directional portion defines a separation layer.

Any of the aspects herein, wherein the separation layer is sized to stagnate fluid flow.

Any of the aspects herein, wherein the separation layer has a thickness of at least about 0.25".

Any of the aspects herein, wherein the at least one directional portion causes the fluid flow to move from a first path to a second path.

Any of the aspects herein, wherein the at least one directional portion blocks the fluid flow from the at least one critical zone.

Any of the aspects herein, wherein the at least one critical zone comprises a critical feature of the component that a cooling rate of the critical feature is affected by the fluid flow at the at least one critical zone.

Any of the aspects herein, wherein the fluid flow is at least one of an air flow, a gas flow, or a liquid flow.

A method for forming a component with controlled heat transfer according to at least one embodiment of the present disclosure comprises receiving instructions in a three-dimensional printer for forming in a build volume a component comprising a plurality of layers of material and at least one directional portion comprising a plurality of layers of material; causing a fluid circulator to cause fluid flow in a first directional relative to the build volume; and causing the three-dimensional printer to form the component and the at least one directional portion, wherein the at least one directional portion causes the fluid flow to move from the first directional to a second directional.

Any of the aspects herein, wherein causing the fluid circulator to cause fluid flow occurs prior to causing the three-dimensional printer to form the component and the at least one directional portion.

Any of the aspects herein, wherein causing the three-dimensional printer to form the component and the at least one directional portion occurs prior to causing the fluid circulator to cause fluid flow.

Any of the aspects herein, wherein the causing the fluid circulator to cause fluid flow occurs at least partially simultaneously with causing the three-dimensional printer to form the component and the at least one directional portion.

Any of the aspects herein, wherein the material comprises at least one of sintered power, wire, paste, slurry, or liquid.

Any of the aspects herein, wherein the at least one directional portion is a wall configured to block the fluid flow or a wall configured to direct the fluid flow relative to the at least one critical zone.

Any of the aspects herein, wherein the component and the at least one directional portion are formed on a build surface in the build volume, and wherein causing the three-dimensional printer to form the component and the at least one directional portion comprises moving at least one of the build surface or the nozzle in a directional perpendicular to the build surface.

A method for controlling a fluid flow during an additive manufacturing process according to at least one embodiment of the present disclosure comprises causing a fluid flow to move across a build surface of a build volume in a first directional; and forming, using a nozzle configured to heat and extrude material to form a layer of material, a component comprising a plurality of layers of material in the build volume and at least one directional portion comprising a plurality of layers of material in the build volume, the component having at least one critical zone, the at least one directional portion configured to at least one of direct the fluid flow to or block the fluid flow from the at least one critical zone, wherein a first layer of the component and the at least one directional portion is formed on the build surface and subsequent layers are form by moving at least one of the nozzle or the build surface in a directional perpendicular to the build surface.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure contained herein. The above-described embodiments, objectives, and configurations are neither complete nor exhaustive. The Summary is neither intended nor should it be construed as being representative of the full extent and scope of the present disclosure. Moreover, references made herein to "the present embodiment" or aspects thereof should be understood to mean certain embodiments of the present disclosure and should not necessarily be construed as limiting all embodiments to a particular description. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description, the drawing figures, and the exemplary claims set forth herein, taken in conjunction with this Summary, define the invention.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments of the invention and, together with the general description of the invention given above and the detailed description of the drawings given below, serve to explain the principles of the invention.

Figure 1A:
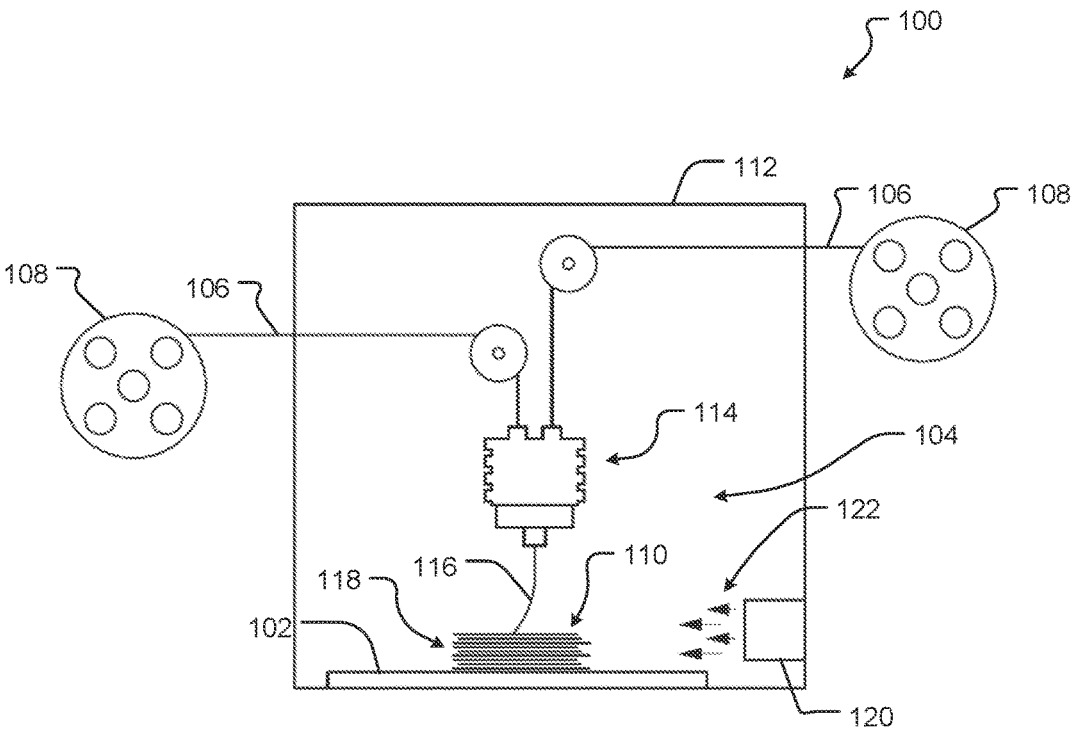
FIG. 1A is a schematic drawing of a 3D printer according to at least one embodiment of the present disclosure.

The drawings are not necessarily to scale and various dimensions may be altered. In certain instances, details that are not necessary for an understanding of the invention or that render other details difficult to perceive may have been omitted. It should be understood, of course, that the disclosure is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

At least one embodiment of the present disclosure is directed to printing (in particular, using FFF techniques) baffles or walls to create localized airway paths to one or more critical zones or features of a component to control or affect the temperature around such critical zones or features. A desired cooling rate of the critical feature of the component depends on the thickness of the critical feature. Thinner features may be more susceptible to overheating (and thus, curling), whereas thicker features may be more susceptible to overcooling (and thus, may shrink). Further, some features may be susceptible to uneven cooling (e.g., a thicker component may have a hot center and a cool exterior). As such, a fluid flow (whether air, gas, liquid, coolant, or the like) may be directed towards some features (e.g., thicker features) and blocked from other features (e.g., thinner features). The baffles or walls may be printed simultaneously or sequentially with the component and knowing the directional and airflow characteristics generated by cooling fan(s), may direct fluid flow away from or to the critical zone or features during the printing process. During the printing process, the baffles or walls create localized paths or airways as each layer is printed. The baffles or walls may be printed on the base and may not connect to the component so that when the base is removed from the component, the air baffles are also removed. Alternatively, the baffles or walls may be connected to the component and may be separated from the final component. Further, the baffles or walls may be printed from the same material as the component or may be printed from a different material.

In another aspect of the disclosure, baffles or walls may be provided to create an enclosed build area. In some embodiments, a 3D printer may already have an enclosed build area, which enables some control of the temperature of the build area relative to an outside environment. In other embodiments, the build area may be open to the surrounding environment and may be susceptible to the outside environment. For example, a draft in a room may affect the temperature of the build area. In such embodiments, one or more walls may be printed to effectively enclose the build area or control the effects of the surrounding environment.

Turning first to FIG. 1A, a schematic drawing of an example 3D printer 100 is shown. The 3D printer 100 may comprise an FFF printer, though in other instances, the 3D printer 100 may be any 3D printer or use any form of additive manufacturing. For example, though not shown, the 3D printer may comprise a selective laser sintering printer, a direct metal laser sintering printer, a selective laser melting printer, or the like.

Figure 1B:
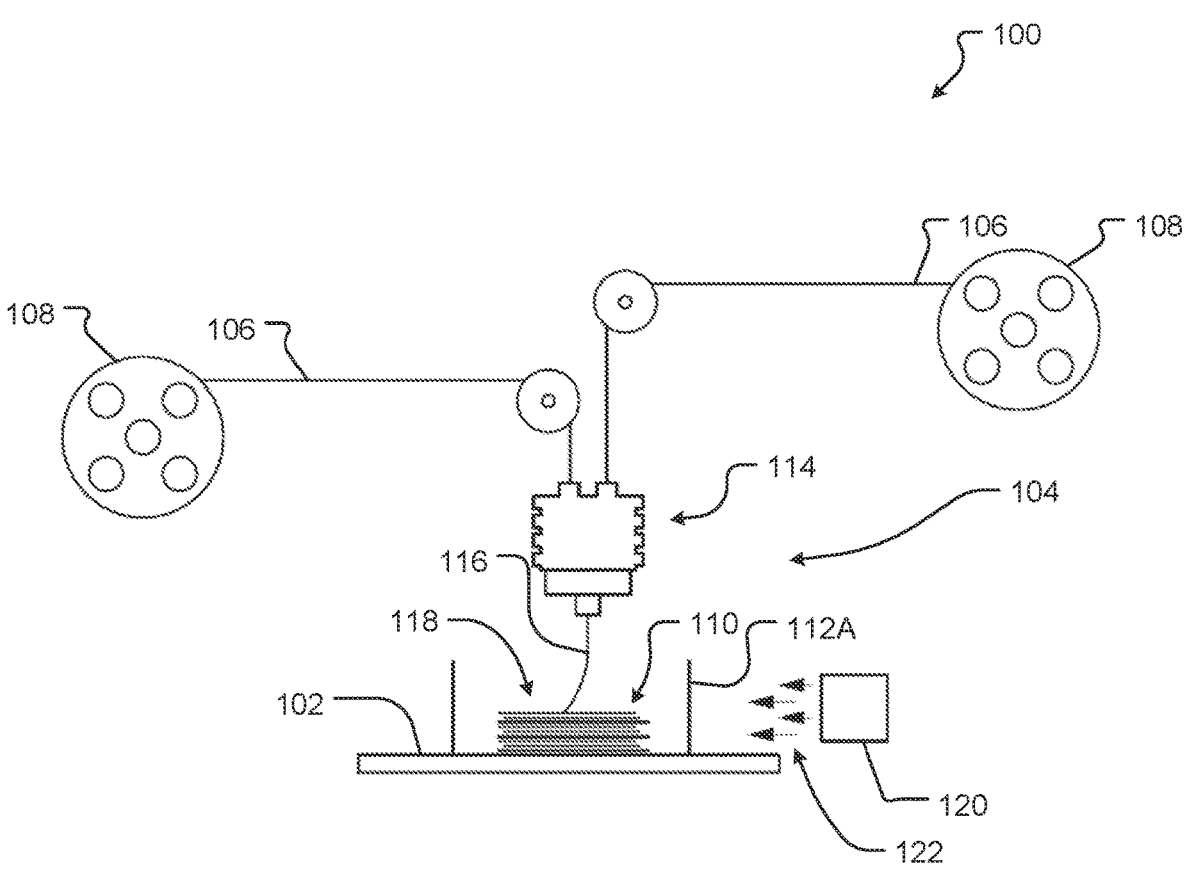
FIG. 1B is a schematic drawing of a 3D printer according to at least one embodiment of the present disclosure.

The 3D printer 100 comprises a base 102 (or build platform), at least one material 106 fed from a material spool 108, and a nozzle or an extrusion head 114 that heats and extrudes the at least one material 106 from a material spool 108. The base 102 may partially define a build volume 104 in which a component 110 (or part) and at least one directional portion 126 (shown in FIGS. 2-8) may be formed. In some embodiments, the 3D printer 100 may include a housing 112, though it will be appreciated that in other embodiments, the 3D printer 100 may not include the housing 112. The housing 112 may comprise one or more walls fully or partially enclosing the build volume 104 and one or more components of the 3D printer 100. In some embodiments, one or more walls 112A may be formed by the 3D printer 100 prior to forming a component or features of a component, as shown in FIG. 1B. In such embodiments, the one or more walls 112A may form the housing. It will be appreciated that in other instances, the housing 112 may be prefabricated.

In the illustrated embodiment of FIG. 1, the 3D printer 100 comprises a pair of material spools 108. In other embodiments, the 3D printer 100 may comprise one, two, or more than two material spools 108. In embodiments where the 3D printer 100 comprises multiple material spools 108, each material spool 108 may have the same material, or may have different materials. In embodiments where the 3D printer 100 comprises the material spool 108, the at least one material 106 may comprise thermoplastic filaments such as, for example, Acrylonitrile Butadiene Styrene (ABS) or Poly Lactic Acid (PLA) or Polyetherketone (PEK). The at least one material 106 is extruded from the nozzle 114 (or extrusion head) as a heated material 116 and is laid down in layers 118 on the base 102 to form the component 110 (or part) and, as illustrated in FIGS. 1-8, the at least one material 106 may also form the at least one directional portion 126 and 126A-C. The nozzle 114 and/or the base 102 are configured to move vertically, or in a direction perpendicular to a plane on a surface of the base 102 as subsequent layers of material are formed. During a printing process, an initial layer 118 of heated material 116 may be extruded and may cool or solidify. Another layer 118 of heated material 116 may then be extruded on top of the initial layer of heated material 116. It will be appreciated that in some instances, a layer of heated material may be extruded on top of a layer of heated material that is not fully solidified or only partially solidified. Any number of layers 118 of the heated material may be extruded to form the component 110 and the at least one directional portion 126.

It will be appreciated that the 3D printer 100 may comprise more or fewer components. For example, in embodiments where the 3D printer 100 is a thermoplastic extrusion or a Directed Energy Deposition (DED) system, the 3D printer 100 may not include the material spool 108. Rather, the at least one material 106 may be stored in a hopper or a container, fed to a base by, for example, an auger conveyor (or any other device configured to transfer the at least one material from the hopper or the container to the base), and sintered or melted on the base. In such embodiments, the at least one material may comprise thermoplastic, sintered powder, any metallic powder, a slurry, or a liquid. Alternatively, the at least one material 106 may be a metallic wire used by the DED system.

The 3D printer 100 may include a fluid circulator 120 configured to cause a fluid to flow across or over the base 102 and through the build volume 104. The fluid circulator 120 may include one, two, or more than two fluid circulators. The fluid may be, for example, air, though in other embodiments, the fluid may be other gases, a liquid or a coolant (e.g., synthetic fluids, semi-synthetic fluids, fluids with oils, oils, etc.). In some embodiments, the fluid circulator 120 may comprise a fan. In other embodiments, the fluid circulator 120 may comprise, for example, a compressor configured to compress and expel the fluid. The compressed fluid may be used to form a fluid flow. In embodiments where the fluid may comprise a liquid or coolant, the fluid circulator 120 may comprise a pump configured to move the liquid or coolant from a liquid or coolant source to the build volume 104. During a printing process, the fluid circulator 120 may cause a fluid flow (whether an air (or other gas) flow or a liquid flow) to move across the build volume 104 and thus, across each layer of heated material 116 as each layer is extruded to form the component 110. As described in more detail below, it may be desirable to control the fluid flow at certain portions of the component 110 to prevent warping, curling, shrinking, or any other undesirable effect to the heated material.

Figure 2:
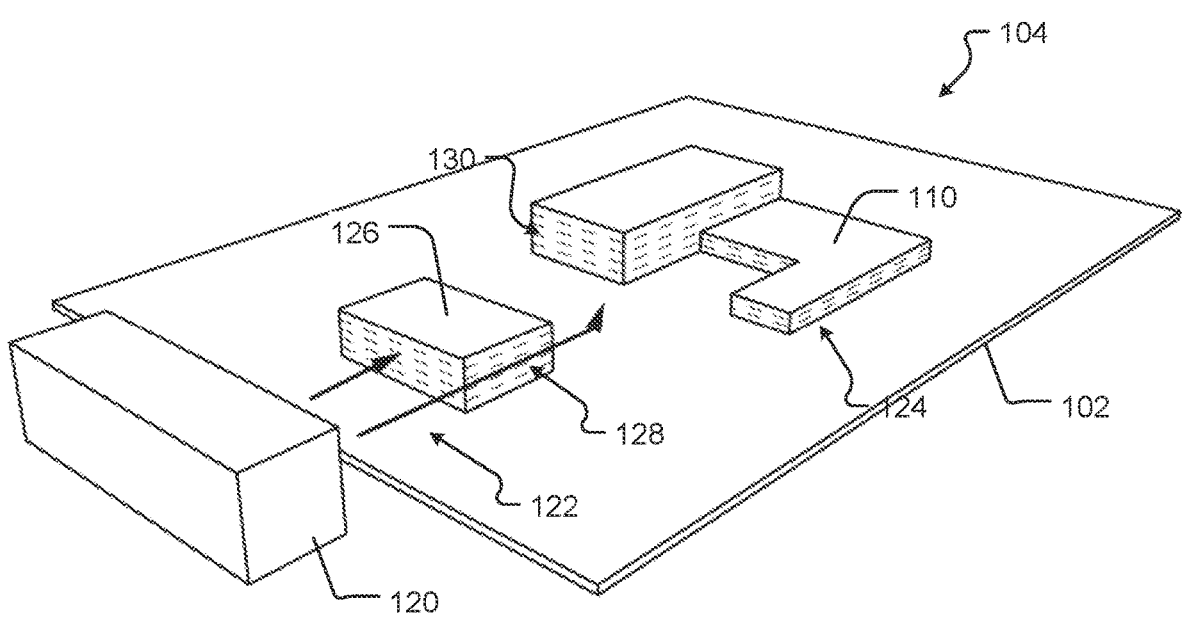
FIG. 2 is an isometric schematic drawing of a build volume according to at least one embodiment of the present disclosure.
Figure 3:
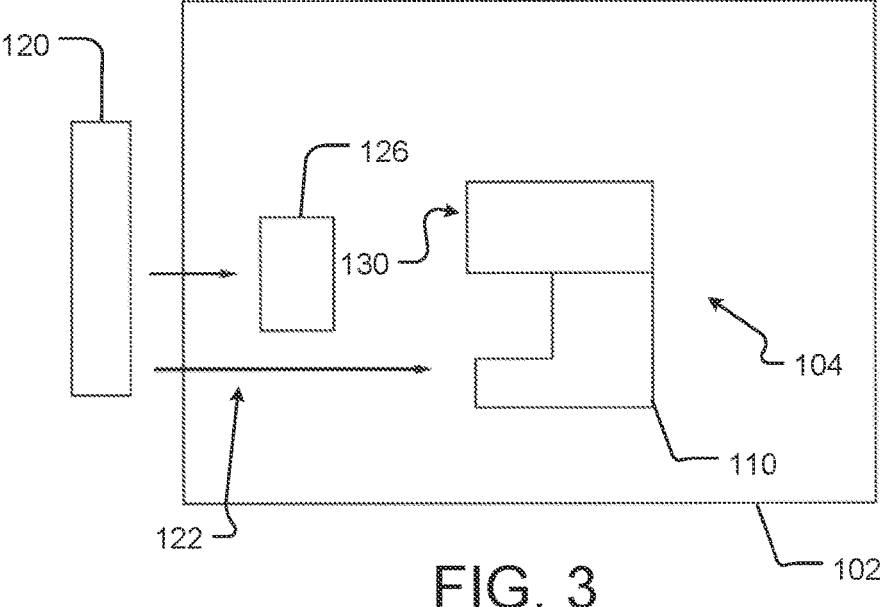
FIG. 3 is a top schematic drawing of the build volume of FIG. 2 according to at least one embodiment of the present disclosure.

Turning to FIGS. 2 and 3, an isometric schematic drawing and a top isometric schematic drawing, respectively, of a build volume 104 are shown. The component 110 comprises a plurality of layers of material 124 and the at least one directional portion 126 comprises a plurality of layers of material 128. The component 110 and the at least one directional portion 126 are shown on the base 102 and the fluid circulator 120 is shown causing a fluid flow 122 to flow over the base 102 and through the build volume 104. As previously described, the build volume 104 may be partially defined by the base 102 of the 3D printer 100 and further comprises a volume extending above the base. In embodiments where the 3D printer 100 comprises a housing 112, the housing 112 may also define the build volume 104. In some embodiments, the plurality of layers of material 124 of the component 110 are a different material than the plurality of layers of material 128 of the at least one directional portion 126. In other embodiments, the plurality of layers of material 124 of the component 110 are the same material than the plurality of layers of material 128 of the at least one directional portion 126.

The component 110 may comprise at least one critical zone 130 where it may be desirable to control a temperature of the at least one critical zone 130 during solidification of the component 110 in the at least one critical zone 130 differently from the remainder of the component 110. The at least one critical zone 130 may comprise a critical feature of the component 110 that is affected by the fluid flow 122 at the at least one critical zone 130. To control such temperature(s) at the at least one critical zone 130, the at least one directional portion 126 may be configured to direct a fluid flow 122 (from, for example, the fluid circulator 120) to or block the fluid flow 122 from the at least one critical zone 130. In other words, the at least one directional portion 126 may cause the fluid flow 122 to move from a first path to a second path (whether the second path is away from or to the at least one critical zone 130). When the component 110 is completed, the component 110 and the at least one directional portion 126 may be removed from the base 102. In some embodiments, a build surface may be first printed and the component 110 and the at least one directional portion 126 may be formed on the build surface. In such embodiments, when the component 110 is completed, the component 110 may be removed from the build surface and the at least one directional portion 126 may or may not be removed from the build surface. In other words, the component 110 may be removed from the build surface. The build surface and the at least one directional portion 126 may be discarded together.

Figure 4:
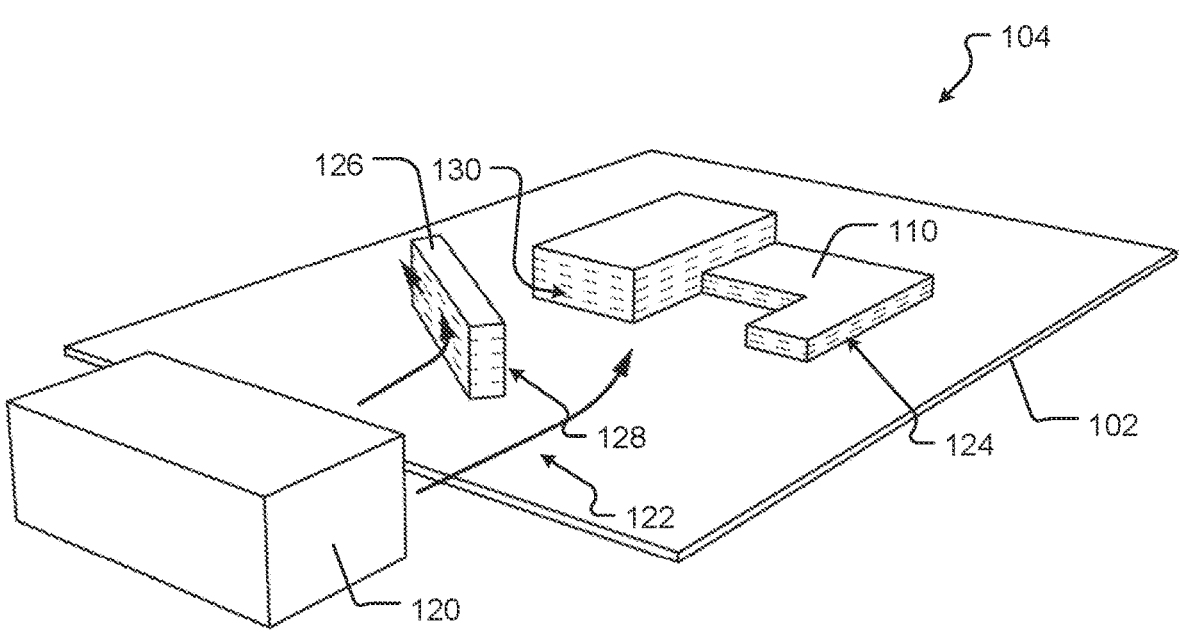
FIG. 4 is an isometric schematic drawing of a build volume according to at least one embodiment of the present disclosure.
Figure 5:
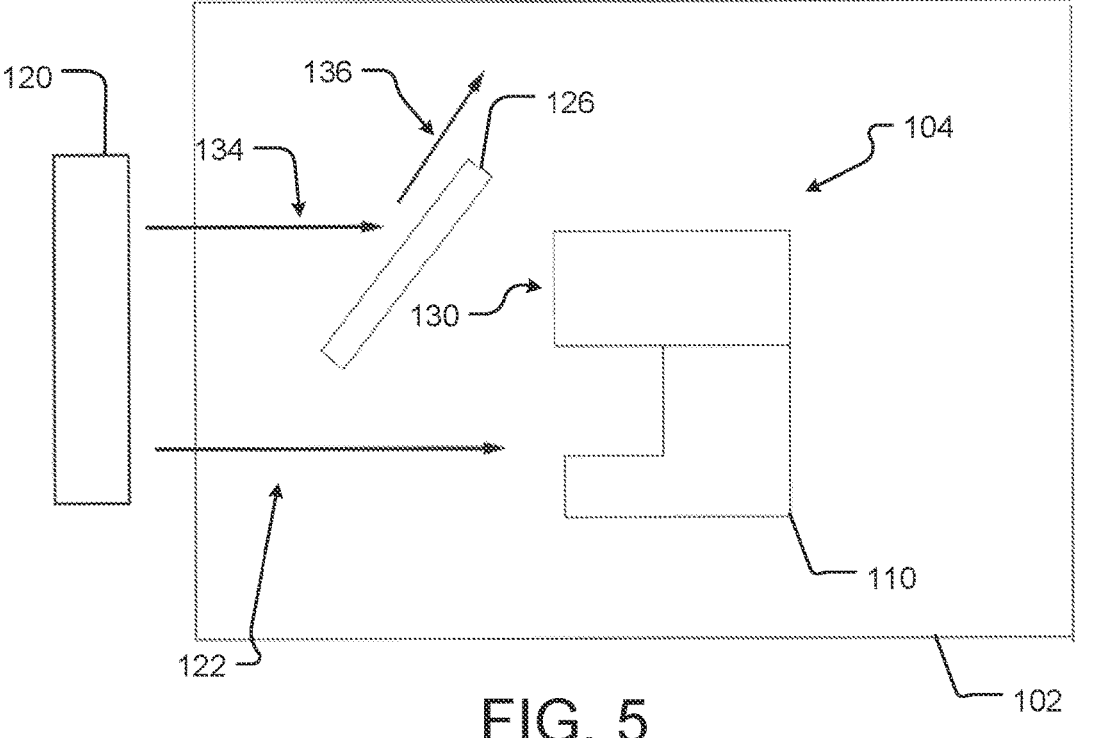
FIG. 5 is a top schematic drawing of the build volume of FIG. 4 according to at least one embodiment of the present disclosure.
Figure 6:
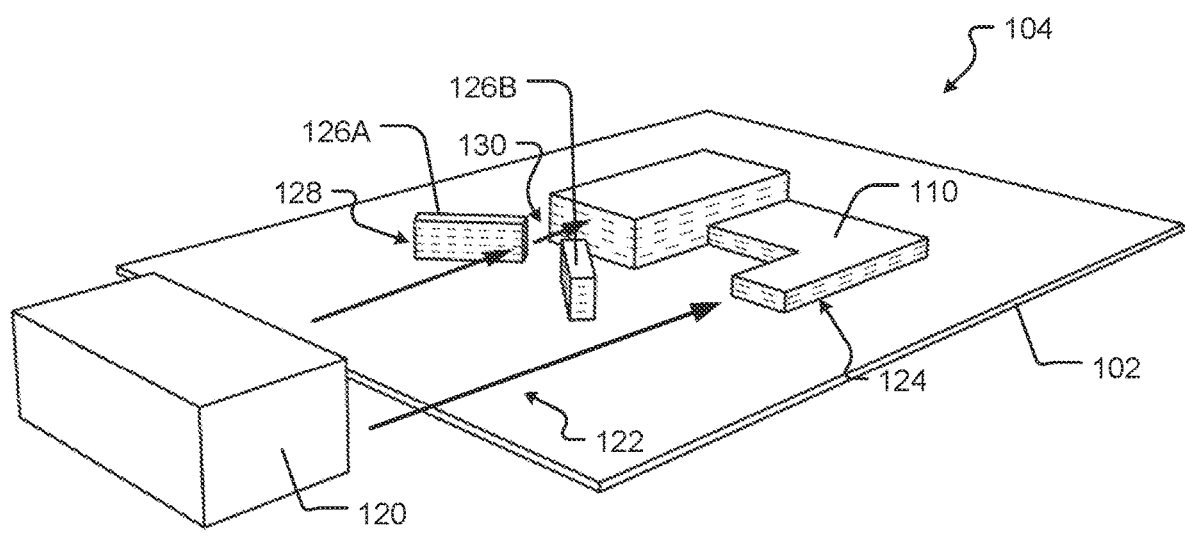
FIG. 6 is an isometric schematic drawing of a build volume according to at least one embodiment of the present disclosure.
Figure 7:
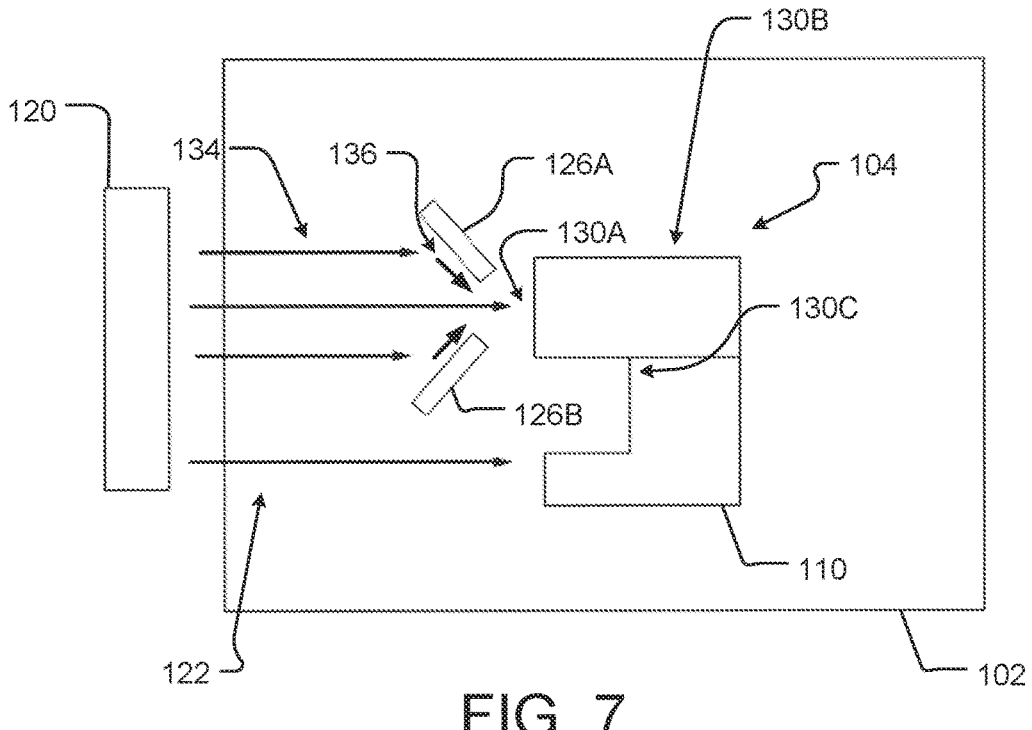
FIG. 7 is a top schematic drawing of the build volume of FIG. 6 according to at least one embodiment of the present disclosure.

The at least one directional portion 126 may be configured to cause the fluid flow 122 to move from a first direction represented by a first arrow 134 (e.g., fluid flowing from the fluid circulator 120, shown in, for example, FIGS. 5 and 7) to a second direction represented by a second arrow 136 (shown in, for example, FIGS. 5 7). In other words, the at least one directional portion 126 may block the fluid flow 122 from directly engaging the at least one critical zone 122 or direct the fluid flow 122 to the at least one critical zone 130. Though the second direction is shown as the arrow 136 angled towards the critical zone 130 in FIG. 7, it will be appreciated that the second direction may be in any direction. In instances where the at least one directional portion 126 is configured to block or otherwise direct the fluid flow 122 away from the at least one critical zone 130 (shown in, for example, FIGS. 2-5), blocking or otherwise directing the fluid flow 122 away from the at least one critical zone 130 may cause the at least one critical zone 130 to cool more slowly than if the fluid flow 122 was allowed to contact the at least one critical zone 130. In other instances where the at least one directional portion 126 is configured to direct the fluid flow 122 to the at least one critical zone 130 (shown in, for example, FIGS. 6 and 7), the at least one directional portion 126 enhances convection by transferring heat from the at least one critical zone 130 to the fluid flow 122. Such direction of the fluid flow 122 towards the at least one critical zone 130 may decrease a cooling time of the at least one critical zone 130. It should be appreciated the directional portion 126 may only partially redirect fluid flow 122 with respect to the critical zone 130.

As shown in the embodiments illustrated in FIGS. 2-5, the at least one directional portion 126 is shown in a configuration in which the at least one directional portion 126 is blocking the at least one critical zone 130, thereby decreasing the fluid flow 122 to the at least one critical feature. Such decreased fluid flow 122 to the at least one critical zone 130 may decrease a heat transfer between the at least one critical zone 130 and the fluid flow 122 compared to other portions of the component 110 that are in the path of the fluid flow 122. Thus, a cooling time of the at least one critical zone 130 may be increased. In such embodiments, the fluid flow 122 may be initially directed perpendicularly to the at least one directional portion 126. As also illustrated, a portion the fluid flow 122 is able to freely flow to a portion of the component 110 that is not blocked by the at least one directional portion 126. It will be appreciated that in other embodiments, the fluid flow 122 may be able to freely flow to any number of portions of the component 100.

Turning to FIGS. 4 and 5, an isometric schematic drawing and a top isometric schematic drawing, respectively, of the build volume 104 are shown. The component 110 comprises the plurality of layers of material 124 and the at least one directional portion 126 comprises the plurality of layers of material 128. The component 110 and the at least one directional portion 126 are shown on the base 102 and the fluid circulator 120 is shown causing a fluid flow 122 to flow over the base 102 and through the build volume 104. As shown in the illustrated embodiments, the at least one directional portion 126 is shown in a configuration in which the at least one directional portion 126 is blocking the at least one critical zone 130, thus decreasing the fluid flow 122 to the at least one critical zone 130. Such decreased fluid flow 122 to the at least one critical zone 130 may decrease a heat transfer between the at least one critical zone 130 and a surrounding environment (e.g., air) compared to other portions of the component 110 that are in the path of the fluid flow 122. Thus, a cooling time of the at least one critical zone 130 may be increased. In such embodiments, the fluid flow 122 may be initially directed at an angle by the at least one directional portion 126. As also illustrated, the fluid flow 122 is able to freely flow to a portion of the component that is not blocked by the at least one directional portion 126.

Turning to FIGS. 6 and 7, an isometric schematic drawing and a top isometric schematic drawing, respectively, of the build volume 104 are shown. The component 110 comprises the plurality of layers of material 124 and the at least one directional portion 126 comprises the plurality of layers of material 128. The component 110 and the at least one directional portion 126 are shown on the base 102 and the fluid circulator 120 is shown causing a fluid flow 122 to flow over the base 102 and through the build volume 104. As shown in the illustrated embodiments, the at least one directional portion 126 is shown in a configuration in which the at least one directional portion 126 comprises a pair of directional portions 126 positioned to guide the fluid flow 122 to the at least one critical zone 130. In such embodiments, the fluid flow 122 is directed towards the at least one critical zone 130. Such increased fluid flow 122 to the at least one critical zone 130 may increase a heat transfer between the at least one critical zone 130 and the fluid flow 122 compared to areas of the component 110 that are not in the direct path of the fluid flow 122. Thus, a relative cooling time of the at least one critical zone 130 may be decreased. As also illustrated, one of the pair of directional portions 126, and more specifically directional portion 126B and a portion of directional portion 126A, may block a critical zones 130B, 130C, respectively. It will be appreciated that in some embodiments, the pair of directional portions 126 (or any directional portion 126 configured to direct the fluid flow 122 towards the at least one critical zone 130) may not block any portion of the component 110.

Figure 8:
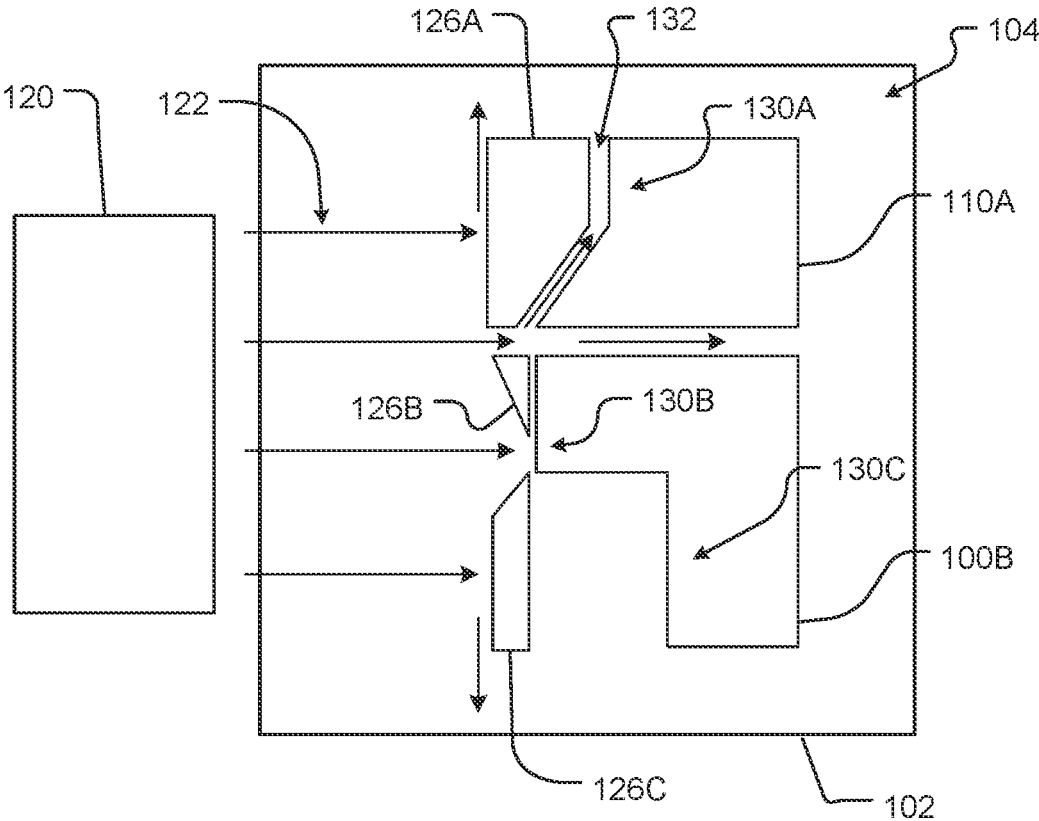
FIG. 8 is a top schematic drawing of a build volume according to at least one embodiment of the present disclosure.

Turning to FIG. 8, a top schematic drawing of the build volume 104 is shown. As shown in the illustrated embodiment, two components 110 and three directional portions 126 are shown disposed on the base 102 and the fluid circulator 120 is shown causing the fluid flow 122. It will be appreciated that two components and three directional portions are shown for illustrative purposes and that any number of components and/or directional portions may be formed. As shown, the three directional portions 126 may be used to control the fluid flow 122 for multiple critical zones 130. For example, a first directional portion 126A may block the fluid flow 122 from a first critical zone 130A, a second directional portion 126B and a third directional portion 126C may direct the fluid flow 122 to a second critical zone 130B, and the third directional portion 126C may also block the fluid flow 122 from a third critical zone 130C.

As further shown, the first directional portion 126 is spaced from the first critical zone 130 of the first component 110 and the space between the first directional portion 126 and the first critical zone 130 define a separation layer 132. In some embodiments, the separation layer 132 may have a thickness or define a gap or space of at least about 0.25". In other embodiments, the separation layer 132 may be less than 0.25". During a printing process, the fluid 122 (e.g., air, water, coolant, etc.) may flow through the separation layer 132 or may be stagnant in the separation layer 132. In embodiments where the fluid flow 122 is stagnant, the separation layer 132 may be sized or shaped to induce stagnation of the fluid flow 122. In embodiments where the fluid flows 122 through the separation layer 132, the separation layer 132 may act as a channel for the fluid flow 122. The channel may direct the fluid flow 122 to another portion of the component 110, to another component 110, anywhere in the build volume 104, or outside of the build volume 104.

It will be appreciated that though the at least one directional portion 126 is illustrated as a wall or a baffle for simplicity, the at least one directional portion 126 may be any shape, size, or configuration. The at least one directional portion 126 may comprise multiple directional portions and/or any complex geometries. In some embodiments, the at least one directional portion may comprise a wall, an airfoil, a baffle, a funnel, a venturi, or the like. Further, any number of components and/or directional portions may be formed in any configuration, pattern, or layout. For example, the fluid flow may be blocked from one component and directed to another component by a directional portion. In another example, the directional portion may be positioned between components or positioned behind a component (to, for example, direct airflow to a side of the component that does not face the fluid flow configuration. Such flexibility in configurations of components and directional portions may increase a reliability of complex components having multiple thicknesses, shapes, or geometries.

Figure 9:
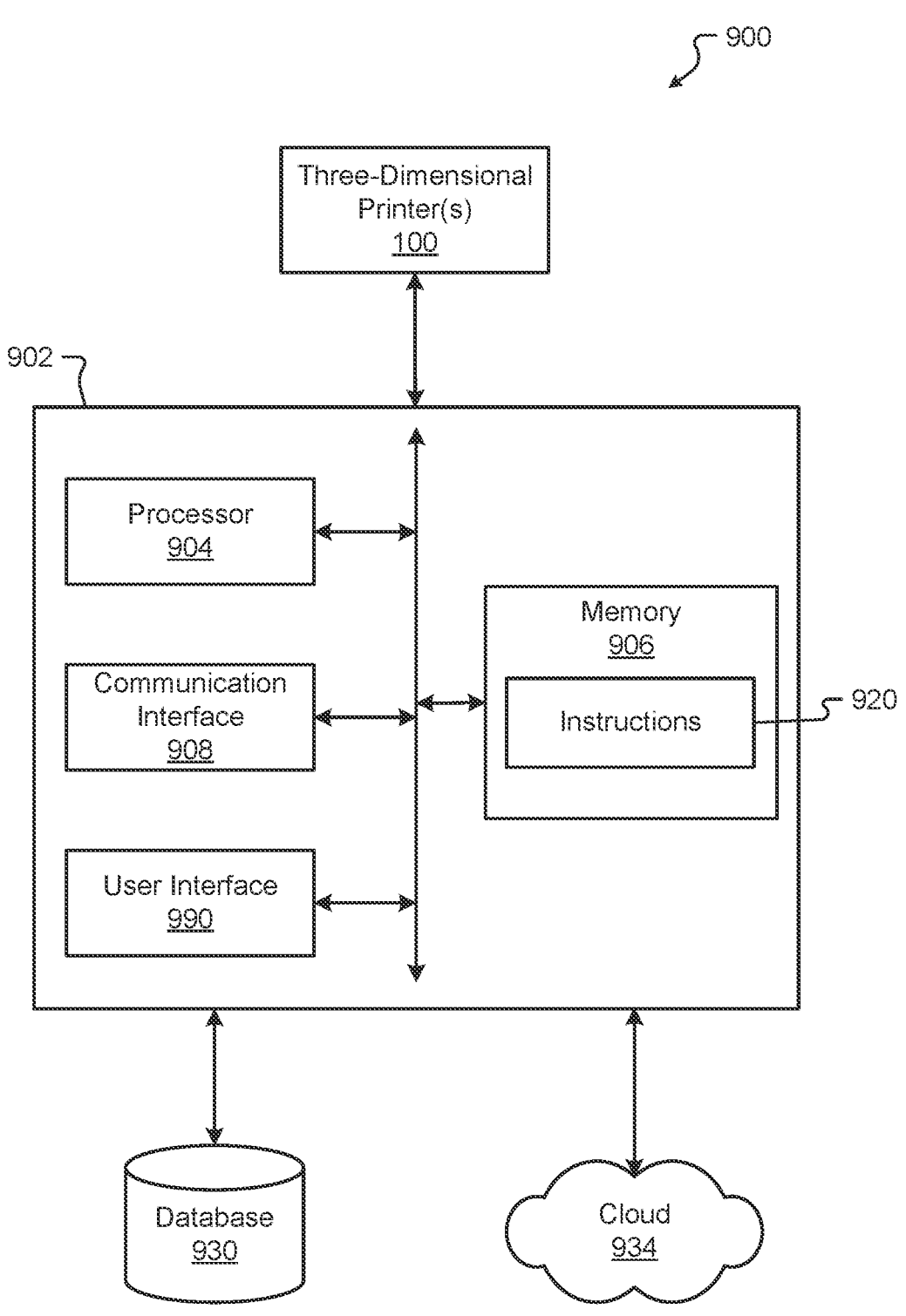
FIG. 9 is a block diagram of a system according to at least one embodiment of the present disclosure.

Turning to FIG. 9, a block diagram of a system 900 according to at least one embodiment of the present disclosure is shown. The system 900 may be used to control, whether by user input, automatically, or a combination thereof, a 3D printer such as the 3D printer 100, and/or carry out one or more other aspects of one or more of the methods disclosed herein. The system 900 comprises a computing device 902, the 3D printer 100, a database 930, and/or a cloud or other network 934. Systems according to other embodiments of the present disclosure may comprise more or fewer components than the system 900. For example, the system 900 may not include one or more components of the computing device 902, the database 930, and/or the cloud 934.

The computing device 902 comprises a processor 904, a memory 906, a communication interface 908, and a user interface 910. Computing devices according to other embodiments of the present disclosure may comprise more or fewer components than the computing device 902.

The processor 904 of the computing device 902 may be any processor described herein or any similar processor. The processor 904 may be configured to execute instructions stored in the memory 906, which instructions may cause the processor 904 to carry out one or more computing steps utilizing or based on data received from another processor, the 3D printer 100, the database 930, and/or the cloud 934.

The memory 906 may be or comprise RAM, DRAM, SDRAM, other solid-state memory, any memory described herein, or any other tangible, non-transitory memory for storing computer-readable data and/or instructions. The memory 906 may store information or data useful for completing, for example, any step of the method 900 described herein, or of any other methods. The memory 906 may store, for example, instructions 920 and/or machine learning models that support one or more functions of the 3D printer 100. The memory 906 may store content or data (e.g., machine learning models, artificial neural networks, deep neural networks, etc.) that can be processed by the processor 904 to carry out the various method and features described herein. Thus, although various contents of memory 906 may be described as instructions, it should be appreciated that functionality described herein can be achieved through use of instructions, algorithms, and/or machine learning models. The data, algorithms, and/or instructions may cause the processor 904 to manipulate data stored in the memory 906 and/or received from or via the 3D printer 100, the database 930, and/or the cloud 934.

The computing device 902 may also comprise a communication interface 908. The communication interface 908 may be used for receiving information such as a 3D model, 3D drawing, or a CAD drawing from an external source (such as a user device, another computing device, the database 930, the cloud 934, and/or any other system or component not part of the system 900), and/or for transmitting instructions or other information to an external system or device (e.g., another computing device 902, the 3D printer 100, the database 930, the cloud 934, and/or any other system or component not part of the system 900). The communication interface 908 may comprise one or more wired interfaces (e.g., a USB port, an Ethernet port, a Firewire port) and/or one or more wireless transceivers or interfaces (configured, for example, to transmit and/or receive information via one or more wireless communication protocols such as 902.11a/b/g/n, Bluetooth, NFC, Zig-Bee, and so forth). In some embodiments, the communication interface 908 may be useful for enabling the device 902 to communicate with one or more other processors 904 or computing devices 902, whether to reduce the time needed to accomplish a computing-intensive task or for any other reason.

The computing device 902 may also comprise one or more user interfaces 910. The user interface 910 may be or comprise a keyboard, mouse, trackball, monitor, television, screen, touchscreen, and/or any other device for receiving information from a user and/or for providing information to a user. The user interface 910 may be used, for example, to receive a user selection or other user input regarding any step of any method described herein. Notwithstanding the foregoing, any required input for any step of any method described herein may be generated automatically by the system 900 (e.g., by the processor 904 or another component of the system 900) or received by the system 900 from a source external to the system 900. In some embodiments, the user interface 910 may be useful to allow an engineer or other user to modify instructions to be executed by the processor 904 according to one or more embodiments of the present disclosure, and/or to modify or adjust a setting of other information displayed on the user interface 910 or corresponding thereto.

Although the user interface 910 is shown as part of the computing device 902, in some embodiments, the computing device 902 may utilize a user interface 910 that is housed separately from one or more remaining components of the computing device 902. In some embodiments, the user interface 910 may be located proximate one or more other components of the computing device 902, while in other embodiments, the user interface 910 may be located remotely from one or more other components of the computer device 902.

The database 930 may store information such as 3D models, 3D drawings, CAD drawings, 3D printer specifications, or any other information useful to operating the 3D printer 100. The database 930 may be configured to provide any such information to the computing device 902 or to any other device of the system 900 or external to the system 900, whether directly or via the cloud 934.

The cloud 934 may be or represent the Internet or any other wide area network. The computing device 902 may be connected to the cloud 934 via the communication interface 908, using a wired connection, a wireless connection, or both. In some embodiments, the computing device 902 may communicate with the database 930 and/or an external device (e.g., a computing device) via the cloud 934.

The system 900 or similar systems may be used, for example, to carry out one or more aspects of any of the method 1000 described herein. The system 900 or similar systems may also be used for other purposes.

Figure 10:
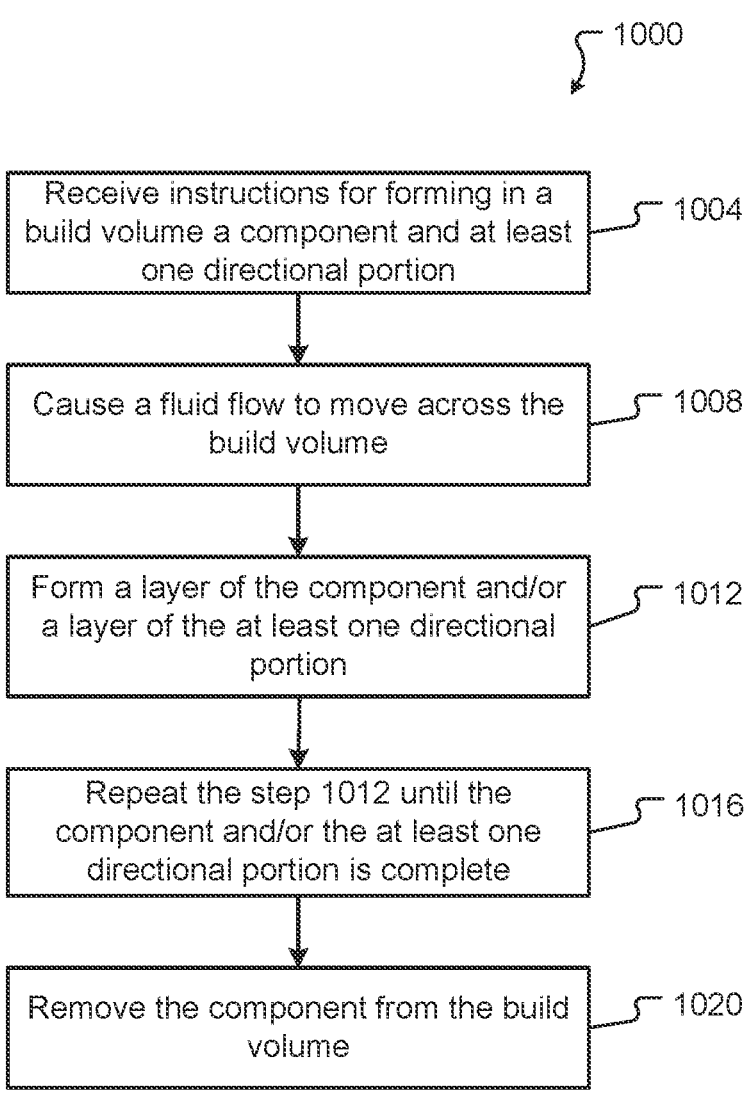
FIG. 10 is a flowchart according to at least one embodiment of the present disclosure.

FIG. 10 depicts a method 1000 that may be used, for example, for controlling a fluid flow during an additive manufacturing using a 3D printer or forming a component with controlled heat transfer using the 3D printer.

The method 1000 (and/or one or more steps thereof) may be carried out or otherwise performed, for example, by at least one processor. The at least one processor may be the same as or similar to the processor(s) 904 of the computing device 902 described above. A processor other than any processor described herein may also be used to execute the method 1000. The at least one processor may perform the method 1000 by executing elements stored in a memory such as the memory 906. The elements stored in the memory and executed by the processor may cause the processor to execute one or more steps of a function as shown in method 1000. One or more portions of a method 1000 may be performed by the processor executing any of the contents of memory. In other embodiments, the method 1000 or any steps of the method 1000 may be performed manually by, for example, a user or an operator of the 3D printer manually operating the 3D printer.

The method 1000 comprises receiving instructions for forming, in a build volume, a component and at least one directional portion (step 1004). The instructions may be received by, for example, a 3D printer such as the 3D printer 100. In some instances, the 3D printer may comprise a FFF printer. In other embodiments, the 3D printer may comprise a thermoplastic extrusion printer or a DED system. In some embodiments, the instructions may be the same as or similar to the instructions 920 and may be received by a computing device such as the computing device 902. In other instances, the instructions may be generated by the computing device based on a 3D model, 3D drawing, or a CAD drawing.

As previously described, the 3D printer may comprise a base such as the base 102 partially defining the build volume, which may be the same as or similar to the build volume 104. The component, which may be the same as or similar to the component 110, and the at least one directional portion, which may be the same as or similar to the at least one directional portion 126, may be formed on the base, and more specifically, on a building surface of the base. The 3D printer 100 also comprises at least one material such as the at least one material 106 fed from a material spool such as the material spool 108 and a nozzle or an extrusion head such as the nozzle 114 that heats and extrudes the at least one material from the material spool to form a layer of material. The nozzle and/or the base are configured to move vertically, or in a direction perpendicular to a plane on a surface of the base, as subsequent layers of material are formed.

The method 1000 also comprises causing a fluid flow to move across the build volume (step 1008). The 3D printer may include a fluid circulator, such as the fluid circulator 120, configured to cause a fluid to flow across or over the base and through the build volume in a first direction. During the printing process, the at least one directional portion may cause the fluid flow to move from the first direction to a second direction, which may be different from the first direction. The fluid may be, for example, air, though in other embodiments, the fluid may be a liquid or a coolant. In some embodiments, the fluid circulator may comprise a fan. In other embodiments, the fluid circulator may comprise, for example, a compressor. In embodiments where the fluid may comprise a gas, liquid or coolant (e.g., synthetic fluids, semi-synthetic fluids, fluids with oils, oils, etc.) the fluid circulator may comprise a pump configured to move the gas, liquid or coolant from a source to the build volume. During a printing process, the fluid circulator may cause the fluid flow (whether a gas flow or a liquid flow) to move across the build volume and thus, across each layer of heated material as each layer is extruded to form the component. Because a temperature of the heated material is sensitive as it is cooling, it is desirable to control the fluid flow at certain portions of the component to prevent warping, curling, shrinking, or any other undesirable effect to the heated material. Such control may be enabled by the at least one directional portion, as described below.

The method 1000 also comprises forming a layer of the component and the at least one directional portion (step 1012). Forming a layer of the component and the at least one directional portion may comprise moving the nozzle longitudinally along the build surface while extruding material from the nozzle. More specifically, The step 1012 includes forming at least a first layer of the component and/or a first layer of the at least one directional portion on the build surface.

The method 1000 also comprises repeating the step 1012 until the component and/or the at least one directional portion is complete (step 1016). Subsequent layers are formed by moving at least one of the nozzle in a direction perpendicular the build surface or the build surface in a direction perpendicular to the nozzle and extruding material from the nozzle to form the subsequent layer A subsequent layer may be formed immediately after a prior layer is formed or may be formed after a period of time after the prior layer is formed (to, for example, allow the prior layer to cool). In some embodiments, the component and the at least one directional portion are formed simultaneously. In other embodiments, the component and the at least one directional portion may be formed separately. For example, the at least one directional portion may be fully or at least partially formed prior to forming the component. It will also be appreciated that the at least one directional portion may be completed prior to the component or vice versa.

During the printing process, the component comprises at least one critical zone where it is desirable to control a temperature of a feature of the component by controlling the fluid flow in the at least one critical zone. The at least one directional portion is positioned so as to provide such control of the fluid flow by directing the fluid flow from the first direction (e.g., the fluid flow as it is being delivered by the fluid circulator) to a second direction. The second direction may be away from or towards the at least one critical zone. In other words, the at least one directional portion may block the fluid flow from the at least one directional portion or direct the fluid flow to the at least one directional portion, thereby increasing or decreasing, respectively, a relative heat transfer between the component and the fluid flow.

The method 1000 also comprises removing the component from the build volume (step 1020). The component may be removed from the build surface or base manually by user. In other instances, the component may be removed from the building surface and the build volume automatically by, for example, a robot. The at least one directional portion may also be removed from the base or build surface. In some embodiments, a build surface may be first printed and the component and the at least one directional portion may be formed on the build surface. In such embodiments, when the component is completed, the component may be removed from the build surface and the at least one directional portion may or may not be removed from the build surface. For example, the component may be removed from the build surface and the at least one directional portion and the build surface may be removed and discarded together.

The present disclosure encompasses embodiments of the method 1000 that comprise more or fewer steps than those described above, and/or one or more steps that are different than the steps described above. Further the steps may occur in any order and may be repeated. For example, the middle steps may be reversed, may occur partially simultaneously, or totally simultaneously.

As noted above, the present disclosure encompasses methods with fewer than all of the steps identified in FIG. 10 (and the corresponding description of the method 1000), as well as methods that include additional steps beyond those identified in FIG. 10 (and the corresponding description of the method 1000). The present disclosure also encompasses methods that comprise one or more steps from one method described herein, and one or more steps from another method described herein. Any correlation described herein may be or comprise a registration or any other correlation.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

The features of the various embodiments described herein are not intended to be mutually exclusive when the nature of those features does not require mutual exclusivity. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by use of the terms or phrases "for example," "such as," "by way of example," "e.g.," and other language commonly understood to indicate that what follows is an example

What is claimed is:

1. A method for controlling a fluid flow during an additive manufacturing process comprising:

causing the fluid flow to continuously move across a build volume including at least one directional portion;

forming at least one component comprising a first plurality of layers of material in the build volume, the at least one component having at least one zone comprising a feature; and forming the at least one directional portion comprising a second plurality of layers of the material in the build volume, the at least one directional portion separate and spaced from the at least one component to form a space between the at least one directional portion and the at least one component, the at least one directional portion directing at least a portion of the fluid flow to or blocking at least a portion of the fluid flow from the at least one zone comprising the feature;

wherein the space between the at least one directional portion and the at least one component is void of the material, and wherein the fluid flow is directed towards the at least one directional portion and the at least one component.

2. The method of claim 1, wherein the at least one directional portion is a wall configured to direct the fluid flow relative to the at least one zone comprising the feature.

3. The method of claim 1, wherein the at least one directional portion is configured to direct the fluid flow to the at least one zone to increase convection to transfer heat between the at least one zone comprising the feature and the fluid flow.

4. The method of claim 1, wherein the additive manufacturing process uses a Fused Filament Fabrication method.

5. The method of claim 1, wherein the space between the at least one component including the at least one zone comprising the feature and the at least one directional portion defines at least one separation layer.

6. The method of claim 5, wherein the at least one separation layer is sized to stagnate the fluid flow.

7. The method of claim 5, wherein the at least one separation layer has a thickness of at least 0.25".

8. The method of claim 1, wherein the at least one directional portion causes the fluid flow to move from a first path to a second path.

9. The method of claim 1, wherein the at least one directional portion blocks the fluid flow from the at least one zone comprising the feature.

10. The method of claim 1, wherein the at least one zone comprising the feature of the component has a cooling rate that is affected by the fluid flow to the at least one zone.

11. The method of claim 1, wherein the fluid flow is at least one of a gas flow or a liquid flow.

12. The method of claim 1, wherein the at least one directional portion is configured to block the fluid flow from the at least one zone comprising the feature.

13. The method of claim 1, further comprising discarding the at least one directional portion following forming the at least one component.

14. A method for forming a component with controlled heat transfer, comprising:

receiving instructions in a three-dimensional printer for forming in a build volume, using a nozzle, the component comprising a first plurality of layers of material and including at least one critical zone of material, and at least one directional portion comprising a second plurality of layers of material on a base;

causing a fluid circulator to cause a cooling fluid to flow across the base, the fluid circulator positioned adjacent to the base and directing the cooling fluid flow across the base; and causing the three-dimensional printer to form the directional portion, the directional portion separate and spaced from the component to form a space between the directional portion and the component, the directional portion causing at least one of directing the cooling fluid flow to or blocking the cooling fluid flow from the at least one critical zone of material, where the temperature of material in the at least one critical zone is controlled differently than material of the component not in the critical zone;

wherein the nozzle moves independently of the fluid circulator, wherein the directional portion causes the cooling fluid flow to move from a first direction to a second direction, and wherein the space between the directional portion and the component is void of the material.

15. The method of claim 14, wherein the three-dimensional printer forms the component and the directional portion after causing the fluid circulator to cause the cooling fluid to flow across the base.

16. The method of claim 14, wherein the three-dimensional printer causing the fluid circulator to cause the cooling fluid to flow across the base occurs after forming the component and the directional portion.

17. The method of claim 14, wherein the causing the fluid circulator to cause the cooling fluid flow occurs at least partially simultaneously with causing the three-dimensional printer to form the component and the directional portion.

18. The method of claim 14, wherein the first plurality of layers of material comprises at least one of sintered powder, wire, paste, slurry, or liquid and the second plurality of layers comprises at least one of sintered powder, wire, slurry, or liquid.

19. The method of claim 14, wherein the directional portion is a wall configured to block the cooling fluid flow or to direct the cooling fluid flow relative to the at least one critical zone of material.

20. The method of claim 19, wherein the component and the directional portion are formed on the base in the build volume, and wherein causing the three-dimensional printer to form the component and the directional portion comprises moving at least one of the base or the nozzle in a direction perpendicular to the base.

21. The method of claim 14, wherein when the cooling fluid flow is caused to move from a first direction to a second direction, the second direction is directed to the at least one critical zone comprising the feature.

22. The method of claim 14, wherein when the cooling fluid flow is caused to move from a first direction to a second direction, the cooling fluid flow is directed away from the at least one critical zone comprising the feature.

23. The method of claim 14, wherein the at least one directional portion is a wall configured to block the cooling fluid flow to the at least one critical zone comprising the feature.

24. A method for controlling a fluid flow during an additive manufacturing process comprising:

causing, using a fluid circulator, a fluid flow to continuously move across a plurality of objects formed on a build surface of a build volume in a first direction, the fluid circulator positioned adjacent to the build surface, wherein the plurality of objects includes a component and a directional portion;

forming, using a nozzle, the component comprising a first plurality of layers of material in the build volume, the component having at least one zone comprising a feature; and forming, using the nozzle, the directional portion comprising a second plurality of layers of material in the build volume, the directional portion forming at least one of a baffle or a wall, the directional portion separate and spaced from the component to form a space between the directional portion and the component, the directional portion directing cooling fluid to or blocking the cooling fluid flow from the at least one zone comprising the feature, where the temperature of material in the zone comprising the feature is controlled differently than material not in the zone comprising the feature, wherein the fluid circulator is independent of the nozzle, wherein the directional portion is not attached to or part of the component, wherein the space between the directional portion and the component is void of the material, and wherein a first layer of material of the component and the first layer of material of the directional portion]are formed on the build surface and subsequent layers are formed by moving at least one of the nozzle or the build surface.

* * * * *